(12) United States Patent
Brenner

(10) Patent No.: US 11,580,403 B2
(45) Date of Patent: Feb. 14, 2023

(54) SYSTEM, METHOD, AND COMPUTER PROGRAM PRODUCT FOR PERFORATED BACKPROPAGATION IN AN ARTIFICIAL NEURAL NETWORK

(71) Applicant: Rorry Brenner, Pittsburgh, PA (US)

(72) Inventor: Rorry Brenner, Pittsburgh, PA (US)

(*) Notice: Subject to any disclaimer, the term of this patent is extended or adjusted under 35 U.S.C. 154(b) by 684 days.

(21) Appl. No.: 16/593,084

(22) Filed: Oct. 4, 2019

(65) Prior Publication Data
US 2020/0111006 A1 Apr. 9, 2020

Related U.S. Application Data

(60) Provisional application No. 62/741,212, filed on Oct. 4, 2018.

(51) Int. Cl.
*G06N 3/08* (2006.01)
*G06N 3/04* (2006.01)
*G06N 3/084* (2023.01)

(52) U.S. Cl.
CPC .............. *G06N 3/084* (2013.01); *G06N 3/04* (2013.01)

(58) Field of Classification Search
CPC ......... G06N 3/084; G06N 3/04; G06N 3/0454
See application file for complete search history.

(56) References Cited

U.S. PATENT DOCUMENTS

| | | | |
|---|---|---|---|
| 2013/0232097 A1* | 9/2013 | Shiv | G06N 3/08 706/20 |
| 2015/0206069 A1* | 7/2015 | Beers | G06N 20/00 706/12 |
| 2017/0206450 A1* | 7/2017 | Umeda | G06N 3/08 |
| 2020/0111006 A1* | 4/2020 | Brenner | G06N 3/084 |
| 2022/0082598 A1* | 3/2022 | Torrini | G01R 23/16 |
| 2022/0172068 A1* | 6/2022 | Kim | G06K 9/628 |

OTHER PUBLICATIONS

Cireşan et al., "Multi-column Deep Neural Networks for Image Classification", 2012 IEEE Conference on Computer Vision and Pattern Recognition, Providence, RI, 2012, pp. 1-8.
Da Silva, "The Cascade-Correlation Neural Network Growing Algorithm using the Matlab Environment", Institute Nacional de Pesquisas Espaciais Laboratório de Computação e Matemática Aplicada, 2005, pp. 1-6.

(Continued)

*Primary Examiner* — Charles T Shedrick
(74) *Attorney, Agent, or Firm* — The Webb Law Firm

(57) ABSTRACT

Provided is a system, method, and computer program product for perforated backpropagation. The method includes segmenting a plurality of nodes into at least two sets including a set of first nodes and a set of second nodes, determining an error term for each node of the set of first nodes, the first set of nodes comprising a first and second subset of nodes, backpropagating the error terms for each node throughout the set of first nodes, determining an error term for each node of the first subset of nodes of the set of first nodes based on direct connections between the first subset of nodes and the second subset of nodes independent of error terms of the set of second nodes, determining an error term for each node of the set of second nodes, and updating weights of each node of the plurality of nodes based on the error term.

14 Claims, 6 Drawing Sheets

(56) References Cited

OTHER PUBLICATIONS

Fahlman et al., "The Cascade-Correlation Learning Architecture", Advances in neural information processing systems, 1990, pp. 524-532, vol. 2.

Frean, "The Upstart Algorithm: A Method for Constructing and Training Feedforward Neural Networks", Neural Computation, 1990, pp. 198-209, vol. 2.

He et al., "Deep Residual Learning for Image Recognition", Submitted to arXiv.org, Dec. 10, 2015, pp. 1-12.

Hinton et al., "Improving neural networks by preventing co-adaptation of feature detectors", ar Xiv preprint arXiv:1207.0580, 2012, pp. 1-18.

Hunter et al., "Selection of Proper Neural Network Sizes and Architectures—A Comparative Study", IEEE Transactions on Industrial Informatics, 2012, pp. 1-13, vol. 8, Issue 2.

Krizhevsky et al., "ImageNet Classification with Deep Convolutional Neural Networks", Advances in neural information processing systems, 2012, vol. 25, Issue 2 pp. 1-9.

Mezard et al., "Learning in feedforward layered networks: the tiling algorithm", Journal of Physics A: Mathematical and General, 1989, pp. 2191-2203, vol. 22.

Sainath et al., "Improvements to Deep Convolutional Neural Networks for LVCSR", 2013 IEEE Workshop on Automatic Speech Recognition and Understanding, 2013, pp. 315-320.

Szegedy et al., "Going deeper with convolutions", 2015 IEEE Conference on Computer Vision and Pattern Recognition, 2015, pp. 1-9.

Szegedy et al., "Intriguing properties of neural networks", Submitted to arXiv.org, Dec. 21, 2013, pp. 1-10.

Trenn, "Multilayer Perceptrons: Approximation Order and Necessary Number of Hidden Units", IEEE Transactions on Neural Networks, 2008, pp. 836-844, vol. 19, Issue 5.

Wilamowski et al., "Solving Parity-N Problems with Feedforward Neural Networks", Proceedings of the International Joint Conference on Neural Networks, 2003, pp. 2546-2551, vol. 4.

Zeiler et al., "Stochastic Pooling for Regularization of Deep Convolutional Neural Networks", Submitted to arXiv.org, Jan. 16, 2013, pp. 1-9.

\* cited by examiner

SYSTEM, METHOD, AND COMPUTER PROGRAM PRODUCT FOR PERFORATED BACKPROPAGATION IN AN ARTIFICIAL NEURAL NETWORK

CROSS-REFERENCE TO RELATED APPLICATION

This application claims priority to U.S. Provisional Patent Application No. 62/741,212, filed on Oct. 4, 2018, which is incorporated herein by reference in its entirety.

BACKGROUND

Field

This disclosure relates generally to artificial neural networks and, in non-limiting embodiments, to systems, methods, and computer-program products for perforated backpropagation in an artificial neural network.

Technical Considerations

In artificial neural networks, backpropagated error terms flow through all connections between nodes in the network in the same manner. Such limitations make it difficult to modify the size of a network after an initial training and to provide complicated features at single nodes.

SUMMARY

According to non-limiting embodiments or aspects, provided is a computer-implemented method of perforated backpropagation, comprising: segmenting, with at least one processor, a plurality of nodes of an artificial neural network into at least two sets of nodes including a set of first nodes and a set of second nodes, wherein each node of the set of second nodes influences at least one node of the set of first nodes; determining, with at least one processor, an error term for each node of the set of first nodes, the first set of nodes comprising a first subset of nodes and a second subset of nodes; backpropagating, with at least one processor, the error terms for each node throughout the set of first nodes; determining, with at least one processor, an error term for each node of the first subset of nodes of the set of first nodes based on direct connections between the first subset of nodes and the second subset of nodes independent of error terms of the set of second nodes; determining, with at least one processor, an error term for each node of the set of second nodes; and updating, with at least one processor, weights of each node of the plurality of nodes based on the error term of each node.

In non-limiting embodiments or aspects, the first subset of nodes comprises presynaptic nodes, and the second subset of nodes comprises postsynaptic nodes. In non-limiting embodiments or aspects, a set of connections of the artificial neural network connect the presynaptic nodes with the postsynaptic nodes via the set of second nodes and through direct connections. In non-limiting embodiments or aspects, the error term for each node of the first subset of nodes is determined based on an apportionment of error attributable to the node affecting error terms of the second subset of nodes. In non-limiting embodiments or aspects, the error term of the first set of nodes is calculated independent of the error terms of the set of second nodes by modifying or ignoring the error terms of the set of second nodes. In non-limiting embodiments or aspects, the artificial neural network is configured to receive, as input, a digital image, and output a classification corresponding to the digital image. In non-limiting embodiments or aspects, each node of the artificial neural network calculates at least one tensor.

According to non-limiting embodiments or aspects, provided is a system for perforated backpropagation, comprising at least one computing device programmed or configured to: segment a plurality of nodes of an artificial neural network into at least two sets of nodes including a set of first nodes and a set of second nodes, wherein each node of the set of second nodes influences at least one node of the set of first nodes; determine an error term for each node of the set of first nodes, the first set of nodes comprising a first subset of nodes and a second subset of nodes; backpropagate the error terms for each node throughout the set of first nodes; determine an error term for each node of the first subset of nodes of the set of first nodes based on direct connections between the first subset of nodes and the second subset of nodes independent of error terms of the set of second nodes; determine an error term for each node of the set of second nodes; and update weights of each node of the plurality of nodes based on the error term of each node.

In non-limiting embodiments or aspects, the first subset of nodes comprises presynaptic nodes, and the second subset of nodes comprises postsynaptic nodes. In non-limiting embodiments or aspects, a set of connections of the artificial neural network connect the presynaptic nodes with the postsynaptic nodes via the set of second nodes and through direct connections. In non-limiting embodiments or aspects, the error term for each node of the first subset of nodes is determined based on an apportionment of error attributable to the node affecting error terms of the second subset of nodes. In non-limiting embodiments or aspects, the error term of the first set of nodes is calculated independent of the error terms of the set of second nodes by modifying or ignoring the error terms of the set of second nodes. In non-limiting embodiments or aspects, the artificial neural network is configured to receive, as input, a digital image, and output a classification corresponding to the digital image. In non-limiting embodiments or aspects, each node of the artificial neural network calculates at least one tensor.

According to non-limiting embodiments or aspects, provided is a computer program product for perforated backpropagation, comprising at least one non-transitory computer-readable medium including program instructions that, when executed by at least one processor, cause the at least one processor to: segment a plurality of nodes of an artificial neural network into at least two sets of nodes including a set of first nodes and a set of second nodes, wherein each node of the set of second nodes influences at least one node of the set of first nodes; determine an error term for each node of the set of first nodes, the first set of nodes comprising a first subset of nodes and a second subset of nodes; backpropagate the error terms for each node throughout the set of first nodes; determine an error term for each node of the first subset of nodes of the set of first nodes based on direct connections between the first subset of nodes and the second subset of nodes independent of error terms of the set of second nodes; determine an error term for each node of the set of second nodes; and update weights of each node of the plurality of nodes based on the error term of each node.

In non-limiting embodiments or aspects, the first subset of nodes comprises presynaptic nodes, and the second subset of nodes comprises postsynaptic nodes. In non-limiting embodiments or aspects, a set of connections of the artificial neural network connect the presynaptic nodes with the postsynaptic nodes via the set of second nodes and through direct connections. In non-limiting embodiments or aspects, the error term for each node of the first subset of nodes is determined based on an apportionment of error attributable to the node affecting error terms of the second subset of nodes. In non-limiting embodiments or aspects, the error term of the first set of nodes is calculated independent of the error terms of the set of second nodes by modifying or ignoring the error terms of the set of second nodes. In non-limiting embodiments or aspects, each node of the artificial neural network calculates at least one tensor.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE FIGURES

Additional advantages and details are explained in greater detail below with reference to the non-limiting, exemplary embodiments that are illustrated in the accompanying figure and appendix, in which.

DETAILED DESCRIPTION

It is to be understood that the embodiments may assume various alternative variations and step sequences, except where expressly specified to the contrary. It is also to be understood that the specific devices and processes illustrated in the attached appendix, and described in the following specification, are simply exemplary embodiments or aspects of the disclosure. Hence, specific dimensions and other physical characteristics related to the embodiments or aspects disclosed herein are not to be considered as limiting. No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Also, as used herein, the terms "has," "have," "having," or the like are intended to be open-ended terms. Further, the phrase "based on" is intended to mean "based at least partially on" unless explicitly stated otherwise.

As used herein, the term "computing device" may refer to one or more data processing devices configured to process data. A computing device may include one or more processors, for example. A computing device may, in some examples, include the necessary components to receive, process, and output data, such as a processor, a display, a memory, an input device, a network interface, and/or the like. A computing device may be a mobile device. A computing device may also be a desktop computer or other form of non-mobile computer, including one or more networked servers including one or more processors. A computing device may also include one or more circuits and/or the like.

Figure 1:
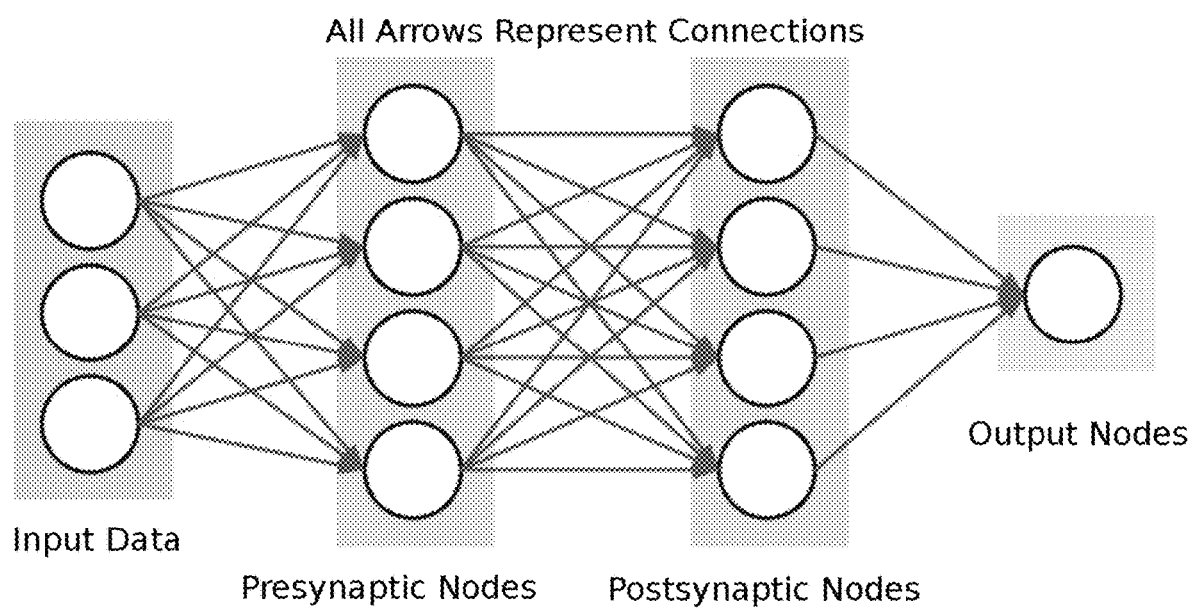
FIG. 1 illustrates an artificial neural network.

Referring now to FIG. 1, an Artificial Neural Network (ANN) 100 is shown. ANNs are composed of nodes and connections. Connections are directional such that each connection is associated with one presynaptic (e.g., anterior) node and one postsynaptic (e.g., posterior) node. In non-limiting examples, the connections and nodes are arranged in layers such that each node of a set of presynaptic nodes form one or more connections to one or more nodes of a set of postsynaptic nodes. Each node in the ANN is configured to calculate an output function based on the input connections to the node, such as by summing all input values after multiplying each value by weights of corresponding input connections. This total value is then passed through a non-linear function to calculate the output. Input values of a set of postsynaptic nodes can be the output values of other presynaptic nodes or values of data being passed into the network at the input layer. A node in a neural network represents any point in the graph representing a network where a non-linear function is calculated in the system.

In the ANN, forward propagation occurs while each node calculates the output function based on data input to the first layer of postsynaptic nodes, which then passes its output as presynaptic nodes to the next set of postsynaptic nodes. This process continues until the final layer of postsynaptic nodes is reached, which outputs the final output of the network. In existing ANNs, backpropagation involves the output nodes of the network determining an error term through a number of possible ways. In particular, each presynaptic node creates its own error term based on its connections, its activation, and the error term of its post synaptic nodes. This process continues until all nodes in the ANN have an error term. The weights of the network are then adjusted based on the error terms of the postsynaptic nodes.

Figure 2:
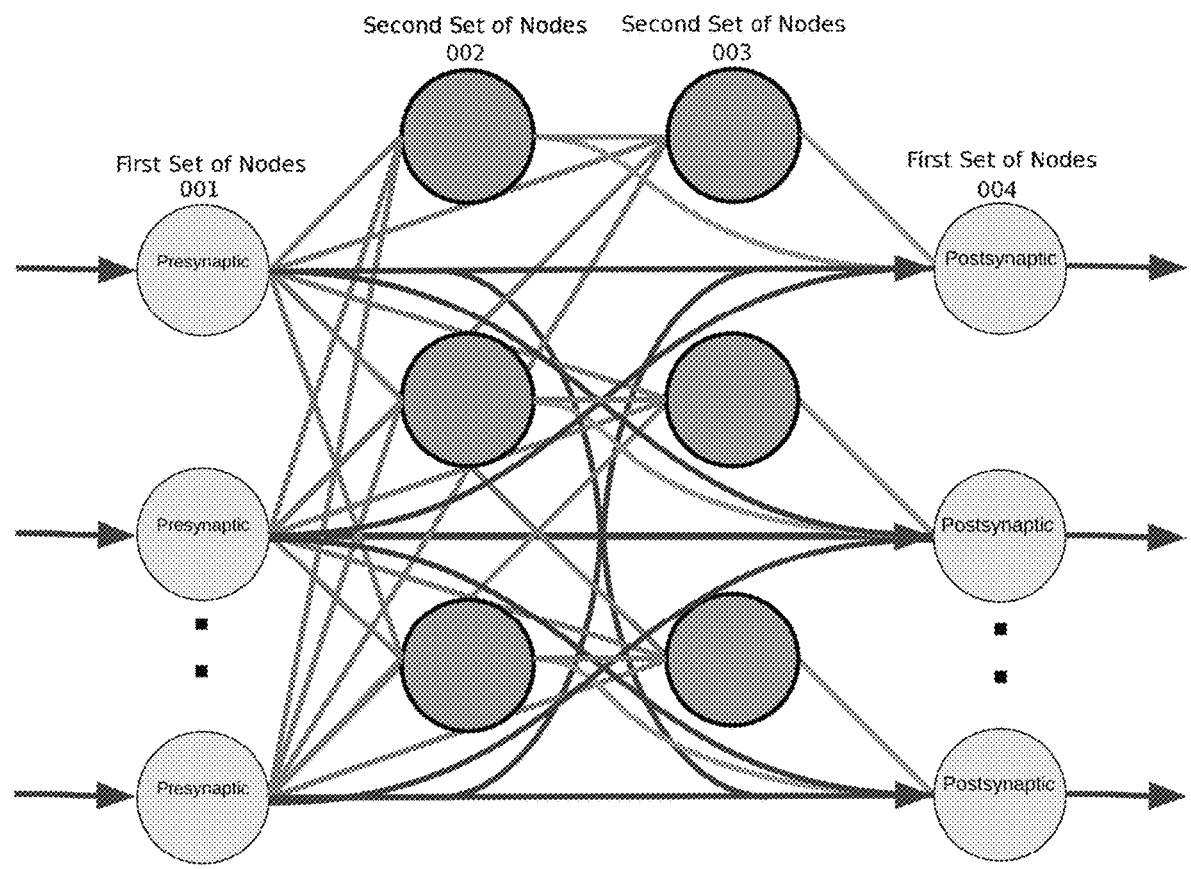
FIG. 2 illustrates a system for perforated backpropagation according to a non-limiting embodiment.

Referring now to FIG. 2, an ANN 2000 is shown for a system of perforated backpropagation according to a non-limiting embodiment. As shown in FIG. 2, the ANN 2000 is modified from existing ANN architectures by adding an additional set of nodes (002 and 003) (e.g., a second set of nodes). These nodes can be added at the initial creation of the networks and/or at a later time after training has already started. The nodes can be added all at once or by adding one or more nodes at a time. The second set of nodes (002 and 003) in this example are PB nodes that receive inputs from connections from presynaptic nodes (001) and other nodes from the second set (e.g., 003 receives inputs from PB node 002), and communicate outputs through connections to other nodes from the second set (e.g., 002 communicates outputs through connections to 003) and postsynaptic nodes 004. Thus, in viewing the example ANN 2000 shown in FIG. 2, the nodes can be viewed as being segmented into either a first set of nodes (001 and 004) or the second set of nodes (002 and 003), where each node in the second set of nodes (002 and 003) influences at least one node of the first set of nodes (004). The first set of nodes includes a first subset of nodes (001) and a second subset of nodes (004). In non-limiting embodiments, an error term for each node of the first set of nodes (001 and 004) and the second set of nodes (002 and 003) is determined. It will be appreciated that various numbers of nodes may be utilized and that the first set of nodes and second set of nodes may each be associated with any number of nodes. For example, there may be a single PB node or as many PB nodes as desired.

With continued reference to FIG. 2, in non-limiting embodiments, the output of each presynaptic node (e.g., nodes 001) is determined and is provided as input to postsynaptic nodes (004) and nodes in the second set of nodes (002 and 003). The output of each of the second set of nodes (002 and 003) is determined, starting with the nodes of the second set which only collect input from presynaptic nodes (002) and then continuing to the nodes of the second set that have input from presynaptic nodes and other nodes in the second set of nodes (e.g., other PB nodes), and then ending with the nodes remaining from the second set which only send output to postsynaptic nodes and not to other PB nodes (003). Once this process is completed, all inputs to the postsynaptic nodes (004) are calculated such that each postsynaptic node can determine its own output based on the inputs.

With continued reference to FIG. 2, the ANN 2000 is configured to modify or ignore the error term that would otherwise be included in a backpropagation process. For example, the error term from nodes from the second set of nodes (002 and 003), which would be included in the error term calculation performed by the presynaptic node (001), may be modified or excluded by the presynaptic node (001) when the presynaptic node (001) is calculating its own error term. After the error terms are determined for the second subset of nodes (004), the error term for each node of the second subset of nodes (004) is backpropagated to the first subset of nodes (001). After continuing backpropagation presynaptically to the input layer, the error term for each node of the first set of nodes (001 and 004) is determined based on direct synaptic connections between the first subset of nodes (001) and the second subset of nodes (004) in the first set of nodes (001 and 004) largely independent (e.g., substantially independent) of the error terms of nodes in the second set of nodes (002 and 003). For example, the error terms of the nodes in the second set of nodes (002 and 003) may be modified or ignored (e.g., excluded) in the determination of the error term. The error term for nodes in the second set of nodes may be determined according to existing backpropagation methods, a cascade correlation, and/or any neural network learning algorithm. In the system described herein, backpropagation is "perforated" because the error, in addition to being backpropagated down the same direction (postsynaptic to presynaptic) as is done in other ANNs, is also used to calculate the error for nodes in the second subset in a manner that does not substantially influence the error being backpropagated further down the network, as in a perforated pipe where the water continues down the main pipe direction while also leaking out the perforations. In some non-limiting embodiments, the error terms of the first set of nodes (001 and 004) are determined prior to determining error terms for the second set of nodes (002 and 003), although it will be appreciated that determinations may be performed in any order. As an example, after error calculation, the weight of connections being input into all nodes (001, 002, 003, and 004) may be adjusted based on their own error term. In some non-limiting embodiments, during a single phase, both sets of nodes may update weights, or only one set may be chosen to update weights such that the system alternates between sets. In some non-limiting embodiments, groups of connections may have their weights fixed and therefore may not continue to update.

The above-described method of perforated backpropagation provides technical improvements over other ANN implementations. First, non-limiting embodiments may increase the number of free parameters, and many neural network systems will improve when the number of free parameters is increased. Moreover, in non-limiting embodiments, the number of free parameters may be increased while keeping the number of decision points constant. In other words, at some point in the network, data from previous nodes are seen by future nodes. This may occur at every layer but, with more modern approaches such as resnets, there are blocks where decision points do not occur as frequently. In non-limiting embodiments, the same number of decision points is maintained while adding many more free parameters to the network, which allows each decision point to do more processing in order to make a smarter and more complicated decision.

Figure 3:
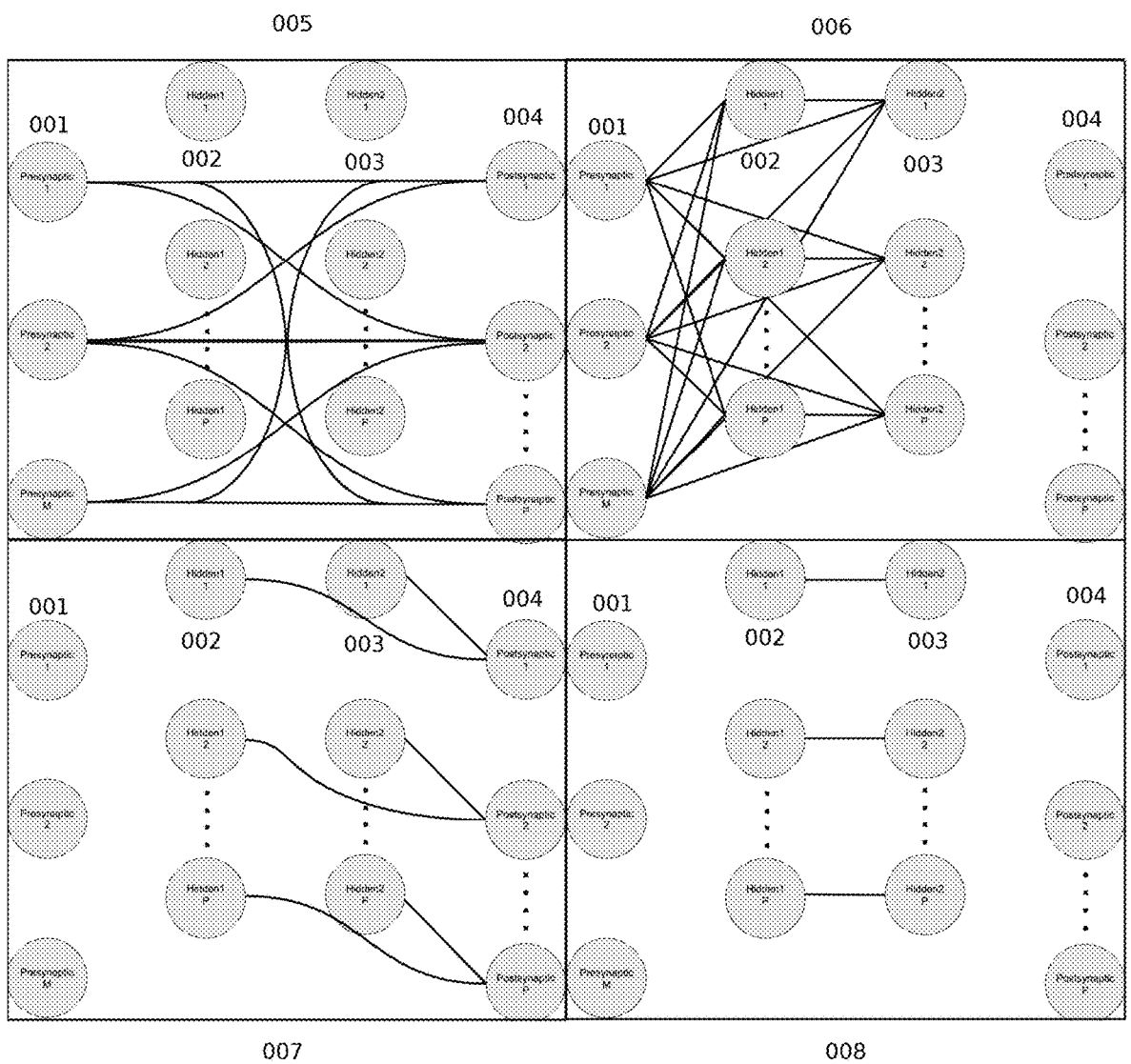
FIG. 3 illustrates sections of the neural network shown in the system of FIG. 2 according to a non-limiting embodiment.

Referring now to FIG. 3, shown is a cross-section of the ANN shown in FIG. 2 to show connections between nodes that are shown as overlapping connections in FIG. 2. Connections are separated into 4 groups identified by the four (4) sections of the image 005, 006, 007, and 008. Section 005 shows connections between presynaptic nodes 001 and post synaptic nodes 004, which behave in accordance with existing ANNs. Section 006 shows connections where the first subset of nodes 001 are the anterior of the connections and where PB nodes (002 and 003) are the posterior of the connections. The connections shown in section 006 behave in accordance with existing ANNs during forward propagation but, during backpropagation, errors from the posterior PB nodes (002 and 003) are modified or ignored during the error calculation of the anterior nodes 001.

With continued reference to FIG. 3, section 007 shows connections where PB nodes (002 and 003) are anterior nodes (to the connections) and the second subset nodes 004 are posterior nodes (to the connections). Section 008 shows connections in which PB nodes (002 and 003) are both the anterior and posterior nodes. In both sections 007 and 008, forward propagation behaves in accordance with existing ANNs during forward propagation. Error terms for PB nodes (002 and 003) may be determined by standard backpropagation through these connections, cascade correlation learning through these connections, or any other manner of neural network learning. These weights may be updated throughout the entire process or, in other non-limiting embodiments, a user may choose to no longer update the weights.

Figure 4:
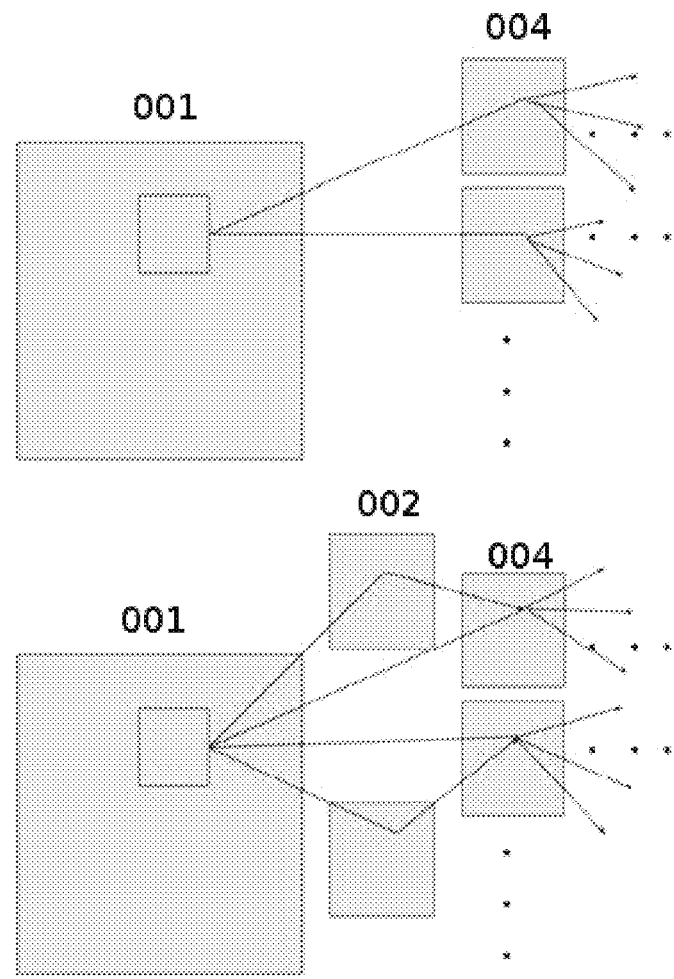
FIG. 4 illustrates a system of perforated backpropagation implemented with a convolutional neural network according to a non-limiting embodiment.

One form of neural networks is a convolutional neural network. In a convolutional neural network, instead of a single node for each input point, there is a set of representative nodes that are "convolved" around an input. Neural networks can also be instantiated in representative methods such as tensors in use by modern architectures, including tensorflow and pytorch. These still behave in the same manner, but with tensors representing weights and output values, and no artificial nodes actually being created. FIG. 4 shows a system of perforated backpropagation implemented with a convolutional neural network according to a non-limiting embodiment. In an existing neural network architecture, layers are typically fully connected. In such existing neural network architectures, a representative kernel or neuron is convolved around an input, such as the pixels of an image, and each neuron outputs a new plane of values for the output it calculated when applied at each location. In a neural network the next layer will be fully connected. For example, in the input layer of an RGB image, the first layer of neurons will have kernels of N width and will therefore have a total of N×N×3 for the total input weights for the three colors. If a first subset layer has K neurons and input width of M, the second subset layer would then have M×M×K total inputs, while if the first subset layer had K+1 neurons, the second subset layer would have M×M×(K+1) total inputs. With the PB nodes in this example, however, each PB node plane only projects input to a single output neuron. Therefore, if the second subset layer adds a set of PB nodes, neurons in the second layer would only have (M×M×K)+1, meaning a single additional input connection from the single corresponding PB node. The PB nodes themselves, however, may all have inputs from the same presynaptic nodes, giving M×M×K inputs for themselves.

The systems and method described herein may be used for various applications. For example, in non-limiting embodiments the system and method may be used for computer vision. In many modern methods for computer vision, neural networks are used in a convolutional manner. In a computer vision problem of classification, a neural network has an input which is a digital picture and outputs a label of a single class corresponding to the picture. The input layer is the N×M×3 RGB pixel values of the image. These values are forward propagated through the network to the output layer. The output layer has K total neurons, where K is the total number of possible correct choices the network is being trained to identify. Whichever neuron outputs the highest value is determined to be the class the network is choosing. In backpropagation, there is an error function at the output layer based on the correct class and all of the output values of all the neurons. One example of an error function is simply L1 Error which is calculated as the correct choice being all 0's for incorrect answers and a 1 for the correct answer, and the neurons' error is the difference between their output and the correct value. This output error will then be backpropagated in the method described herein.

In non-limiting embodiments, the system described herein may be used to process any form of digital data and output a set of values to be used, for example, to make decisions about that data. As examples, input data may be a 3D matrix for the pixel values of an RGB image, the price history of a stock, time series data for video or audio data, or any number of other digital inputs. Output values may be, for example, a pixel-by-pixel segmentation classification of what objects compose an image, a decision about an action to take given a set of input data, a full sentence describing what is happening in a video, additional data that replicates the original data, and/or any number of other digital outputs.

In non-limiting embodiments, a neural network can be trained using the backpropagation algorithm over a dataset such as MNIST. After the network has gone through many epochs through the entire dataset, the error rate stops improving. At this point, a set of PB nodes can be added to every node in the network. At this time, the weights of the Normal nodes are locked and only the PB nodes update their weights. Learning resumes where backpropagation is first calculated through the first set nodes, however, the weights are never updated. Backpropagation is only performed to calculate an error term. After each input value is backpropagated through the first set of nodes, the second set of nodes learn through the cascade correlation learning paradigm as if their single first set parent node is the output node of the cascade correlation network. This process continues until the PB nodes stop improving their correlation. Then, the PB nodes weights are locked, and the first set nodes begin learning again, only with one additional input weight (from the PB node). This has been shown to allow the error rate to continue to be reduced and can be repeated to further decrease error rate.

Figure 5:
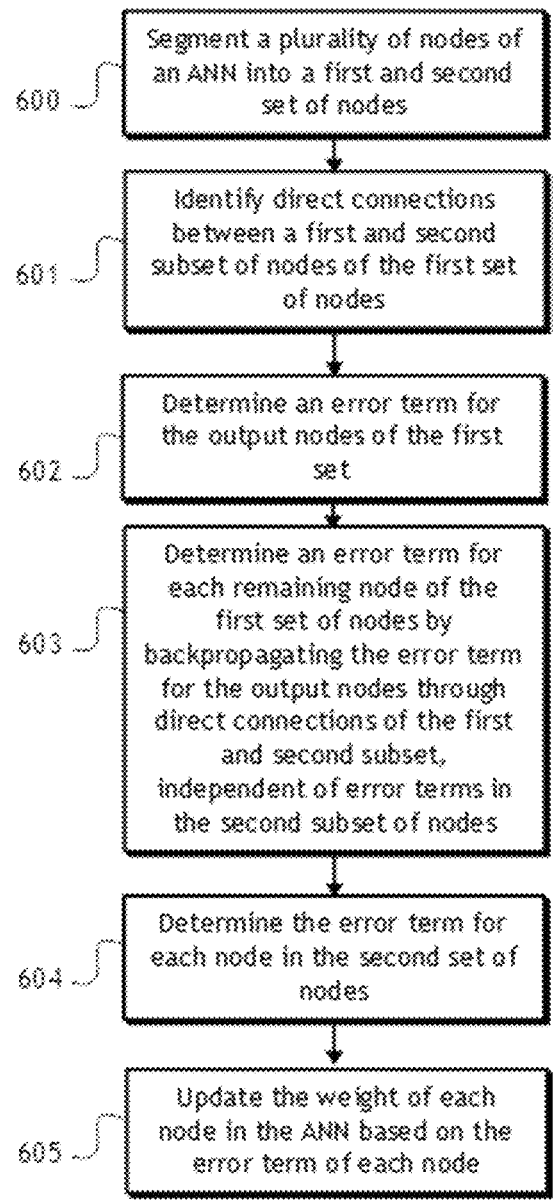
FIG. 5 illustrates a flow diagram for a method of perforated backpropagation according to a non-limiting embodiment.

Referring now to FIG. 5, shown is a flow diagram for a method of perforated backpropagation according to a non-limiting embodiment. It will be appreciated that steps 600-605 shown in FIG. 5 are for illustration purposes only, and that additional steps, different steps, and/or a different order of steps are possible in accordance with the systems and methods described herein.

Figure 6:
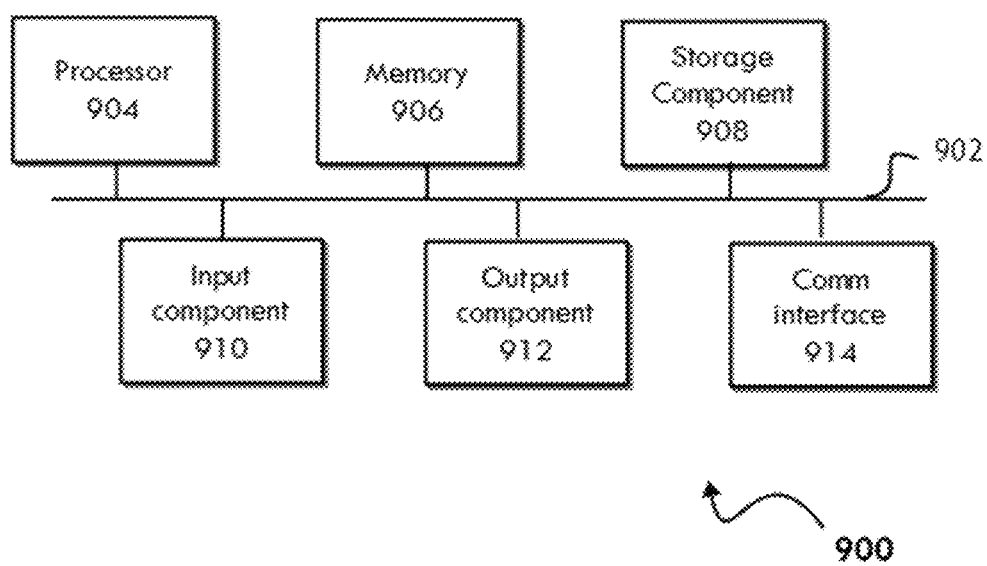
FIG. 6 illustrates example components of a computing device used in connection with non-limiting embodiments.

Referring now to FIG. 6, shown is a diagram of example components of a computing device 900 for implementing and performing the systems and methods described herein according to non-limiting embodiments. In some non-limiting embodiments, device 900 may include additional components, fewer components, different components, or differently arranged components than those shown in FIG. 6. Device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 6, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A computer-implemented method of perforated backpropagation in an artificial neural network comprising a plurality of nodes arranged between an input layer and an output layer, the plurality of nodes comprising a set of first nodes including presynaptic nodes and postsynaptic nodes, and a set of second nodes between the presynaptic nodes and the postsynaptic nodes of the set of first nodes, comprising:
segmenting, with at least one processor, the plurality of nodes of the artificial neural network into the set of first nodes and the set of second nodes, wherein the artificial neural network comprises direct connections between the presynaptic nodes and the set of second nodes, direct connections between the presynaptic nodes and the postsynaptic nodes, and direct connections between the set of second nodes and the postsynaptic nodes;
determining, with at least one processor, an error term for each node of the postsynaptic nodes;
determining, with at least one processor, an error term for each node of the set of second nodes based on error terms of the postsynaptic nodes;
determining, with at least one processor, an error term for each node of the presynaptic nodes based on error terms backpropagated from the postsynaptic nodes independent of the error terms of the set of second nodes, such that error terms of the set of second nodes are excluded from the determination of the error terms of the presynaptic nodes;
and
updating, with at least one processor, weights of each node of the plurality of nodes based on the error term of each node.

2. The computer-implemented method of claim 1, wherein the error term for each node of the presynaptic nodes is determined based on an apportionment of error attributable to the node affecting error terms of the postsynaptic nodes.

3. The computer-implemented method of claim 1, wherein the error term of the set of first nodes is calculated independent of the error terms of the set of second nodes by modifying or ignoring the error terms of the set of second nodes.

4. The computer-implemented method of claim 1, wherein the artificial neural network is configured to receive, as input, a digital image, and output a classification corresponding to the digital image.

5. The computer-implemented method of claim 1, wherein each node of the artificial neural network calculates at least one tensor.

6. A system for perforated backpropagation in an artificial neural network comprising a plurality of nodes arranged between an input layer and an output layer, the plurality of nodes comprising a set of first nodes including presynaptic nodes and postsynaptic nodes, and a set of second nodes between the presynaptic nodes and the postsynaptic nodes of the set of first nodes, comprising at least one computing device programmed or configured to:
segment the plurality of nodes of the artificial neural network into the set of first nodes and the set of second nodes, wherein the artificial neural network comprises direct connections between the presynaptic nodes and the set of second nodes, direct connections between the presynaptic nodes and the postsynaptic nodes, and direct connections between the set of second nodes and the postsynaptic nodes;
determine an error term for each node of the postsynaptic nodes;
determine an error term for each node of the set of second nodes based on error terms of the postsynaptic nodes;
determine an error term for each node of the presynaptic nodes based on error terms backpropagated from the postsynaptic nodes independent of the error terms of the set of second nodes, such that error terms of the set of second nodes are excluded from the determination of the error terms of the presynaptic nodes;
and
update weights of each node of the plurality of nodes based on the error term of each node.

7. The system of claim 6, wherein the error term for each node of the presynaptic nodes is determined based on an apportionment of error attributable to the node affecting error terms of the postsynaptic nodes.

8. The system of claim 6, wherein the error term of the set of first nodes is calculated independent of the error terms of the set of second nodes by modifying or ignoring the error terms of the set of second nodes.

9. The system of claim 6, wherein the artificial neural network is configured to receive, as input, a digital image, and output a classification corresponding to the digital image.

10. The system of claim 6, wherein each node of the artificial neural network calculates at least one tensor.

11. A computer program product for perforated backpropagation in an artificial neural network comprising a plurality of nodes arranged between an input layer and an output layer, the plurality of nodes comprising a set of first nodes including presynaptic nodes and postsynaptic nodes, and a set of second nodes between the presynaptic nodes and the postsynaptic nodes of the set of first nodes, comprising at least one non-transitory computer-readable medium including program instructions that, when executed by at least one processor, cause the at least one processor to:
- segment the plurality of nodes of the artificial neural network into the set of first nodes and the set of second nodes, wherein the artificial neural network comprises direct connections between the presynaptic nodes and the set of second nodes, direct connections between the presynaptic nodes and the postsynaptic nodes, and direct connections between the set of second nodes and the postsynaptic nodes;
- determine an error term for each node of the postsynaptic nodes;
- determine an error term for each node of the set of second nodes based on error terms of the postsynaptic nodes;
- determine an error term for each node of the presynaptic nodes based on error terms backpropagated from the postsynaptic nodes independent of the error terms of the set of second nodes, such that error terms of the set of second nodes are excluded from the determination of the error terms of the presynaptic nodes; and
- update weights of each node of the plurality of nodes based on the error term of each node.

12. The computer program product of claim 11, wherein the error term for each node of the presynaptic nodes is determined based on an apportionment of error attributable to the node affecting error terms of the postsynaptic nodes.

13. The computer program product of claim 11, wherein the error term of the set of first nodes is calculated independent of the error terms of the set of second nodes by modifying or ignoring the error terms of the set of second nodes.

14. The computer program product of claim 11, wherein each node of the artificial neural network calculates at least one tensor.

* * * * *